United States Patent
Su et al.

(10) Patent No.: US 8,807,489 B2
(45) Date of Patent: Aug. 19, 2014

(54) STRAIN RELIEVING ELEMENT MOLDED ON A CABLE

(75) Inventors: Ping-Sheng Su, New Taipei (TW); Jun Chen, Kunshan (CN); Feng-Jun Qi, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 47 days.

(21) Appl. No.: 13/303,020

(22) Filed: Nov. 22, 2011

(65) Prior Publication Data

US 2012/0125662 A1   May 24, 2012

(30) Foreign Application Priority Data

Nov. 22, 2010   (CN) .......................... 2010 1 0553223

(51) Int. Cl.
  *H01R 13/627*   (2006.01)
  *H01R 3/00*   (2006.01)
(52) U.S. Cl.
  USPC ................ 248/49; 248/56; 174/135; 439/447
(58) Field of Classification Search
  USPC .............. 248/49, 56; 439/352, 353, 358, 490, 439/607.46, 607.48, 447, 455; D13/147; 174/135
  See application file for complete search history.

(56) References Cited

U.S. PATENT DOCUMENTS

| | | | | |
|---|---|---|---|---|
| 3,395,244 A | * | 7/1968 | Koehler | 174/135 |
| 3,721,939 A | * | 3/1973 | Paugh | 439/354 |
| 4,310,213 A | * | 1/1982 | Fetterolf et al. | 439/320 |
| 4,568,047 A | * | 2/1986 | Matsui | 248/56 |
| 5,340,330 A | * | 8/1994 | Dolson et al. | 439/447 |
| 6,139,354 A | * | 10/2000 | Broussard | 439/447 |
| 7,758,373 B2 | * | 7/2010 | Zhou et al. | 439/490 |
| 7,785,136 B2 | * | 8/2010 | Zhang et al. | 439/490 |
| 2005/0026492 A1 | * | 2/2005 | Zhang et al. | 439/358 |
| 2007/0020989 A1 | | 1/2007 | Liu et al. | |

FOREIGN PATENT DOCUMENTS

TW    201025753    7/2010

* cited by examiner

*Primary Examiner* — Anita M King
(74) *Attorney, Agent, or Firm* — Wei Te Chung; Ming Chieh Chang

(57) ABSTRACT

A strain relieving element, comprising: a front surface, a rear surface opposite to the front surface, an intermediate portion connecting the front surface to the rear surface, a receiving passage passing through the front surface and the rear surface, two rows of through cavities extending inwardly from the intermediate portion at least, a rib dividing the adjacent through cavities in same row and a convex respectively formed between the adjacent rows of the through cavities, and between the adjacent rows of the ribs. The rib near to the rear surface is bigger than the rib far from the rear surface, the width of the ribs are gradually decreased along an axis direction from the rear surface to the front surface.

19 Claims, 3 Drawing Sheets

STRAIN RELIEVING ELEMENT MOLDED ON A CABLE

FIELD OF THE INVENTION

The present invention relates to a strain relieving element, and more particularly to a strain relieving element molded on a cable. The application relates to a copending application having the same inventors, the same assignee, the same title and the same filing date with the instant application.

DESCRIPTION OF PRIOR ART

Recently, more and more electrical devices have been widely spread and applied, such as notebooks, projectors and players, etc. Each of the electrical devices has a cable assembly connecting to a power supply or other electrical devices. The electrical devices are often not fixed in one place to use. A section of a cable connecting to the electrical device is suffered large torsional or bending stress and the cable may be damaged when the electrical device is moved. So, we need a method enhancing connecting strength between the cable and the electrical devices for protecting the cable from damaging. Nowadays, a strain relieving element which is molded on a junction between the cable and the electrical device can be overcame the above problems. However, in existing technology, the design of the strain relieving element has some problems that: the stress of the strain relieving element being not entirely maximizing released and the strain relieving element or/and the cable being broken when using the electrical device.

As discussed above, an improved strain relieving element overcoming the shortages of existing technology is needed.

SUMMARY OF THE INVENTION

Accordingly, an object of the present invention is to provide a strain relieving element having an improved function with anti-bending.

In order to achieve the above-mentioned objects, a strain relieving element, comprising: a front surface, a rear surface opposite to the front surface, an intermediate portion connecting the front surface to the rear surface, a receiving passage passing through the front surface and the rear surface, two rows of through cavities extending inwardly from the intermediate portion at least, a rib dividing the adjacent through cavities in same row and a convex respectively formed between the adjacent rows of the through cavities, and between the adjacent rows of the ribs. The rib near to the rear surface is bigger than the rib far from the rear surface, the width of the ribs are gradually decreased along an axis direction from the rear surface to the front surface.

Other objects, features and advantages of the invention will be apparent from the following detailed description taken in connection with the accompanying drawings.

DETAILED DESCRIPTION OF PREFERRED EMBODIMENTS

Figure 1:
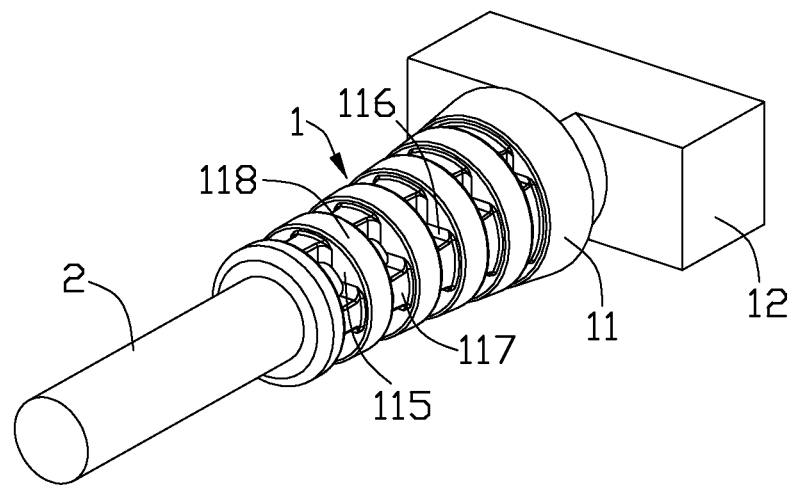
FIG. 1 is an assembled view of a strain relieving element in accordance with the present invention connected to a cable.

Reference will now be made to the drawing figures to describe the present invention in detail.

Figure 2:
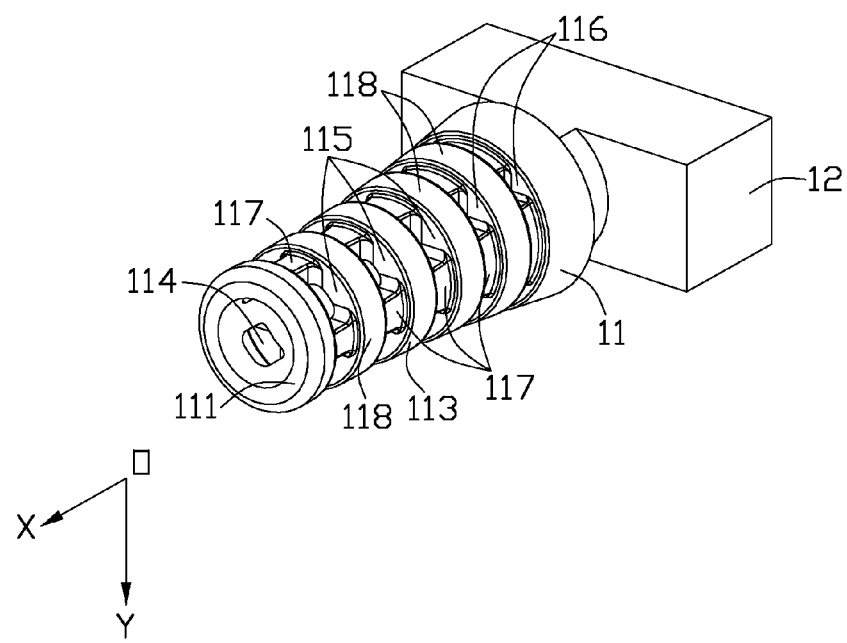
FIG. 2 is a perspective view of the strain relieving element shown in FIG. 1.
Figure 3:
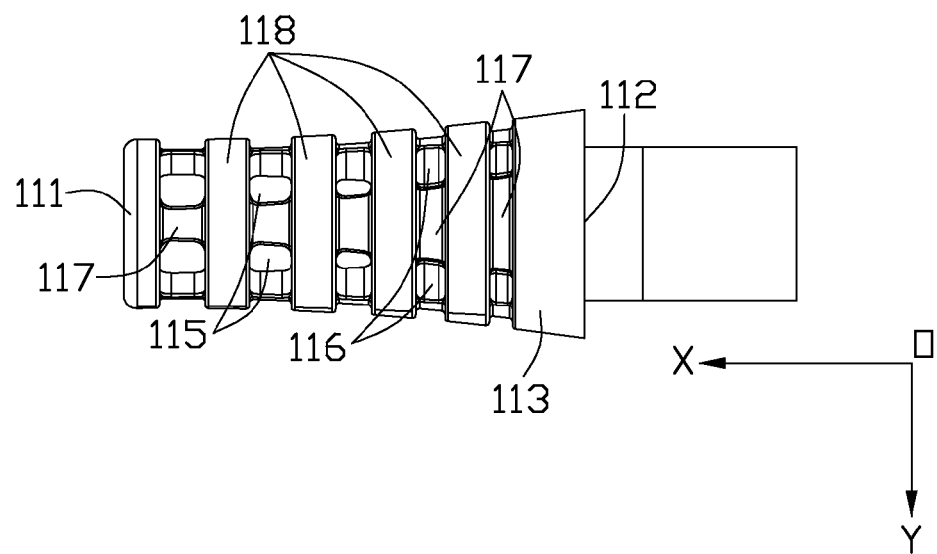
FIG. 3 is a plan view, taken along a XOY plan of the strain relieving element shown in FIG. 2.

Referring to FIGS. 1 to 3, a strain relieving element 1 in accordance with the present invention is made of plastic and comprises a stress releasing portion 11 located on a front end thereof. In this embodiment, the stress releasing portion 11 is of truncated coned-typed. in other embodiments, the stress releasing portion 11 may be of rectangular or irregular shape. The stress releasing portion 11 defines a front surface 111, a rear surface 112 opposite to the front surface 111, an intermediate portion 113 between the front surface 111 and the rear surface 112 and a receiving passage 114 run through the front and rear surface 111, 112. The diameter of the front surface 111 is smaller than the diameter of the rear surface 112. The area of the front surface 111 is smaller than the area of the rear surface 112.

Referring to FIGS. 2 to 3, for conveniently describing the technical approach, we define a X-axis along a central axis of the stress releasing portion 11 (a direction from the center of the rear surface 112 to the center of the front surface 111) and a Y-axis with one of direction perpendicular to the X-axis. The X-axis and the Y-axis together form a XOY plan.

Referring to FIG. 2, the stress releasing portion 11 further comprises a plurality of through cavities 115 recessing inwardly from the intermediate portion 113 and communicated with the receiving passage 114. A plurality of notches 116 is formed by recessing inwardly from the intermediate portion 113 of the stress releasing portion 11. The notches 116 are apart from the receiving passage 114. A certain thickness is defined between the bottom of the notches 116 and the receiving passage 114. The distance from the notches 116 to the rear surface 112 is closer than the distance from the through cavities 115 to the rear surface 112. It should be noted that the plurality of cavities 115 and notches 116 can also be regarded a plurality of dents.

Along the center axis direction of the stress releasing portion 11, the notches 116 are arranged in one row at least and the through cavities 115 are arranged in two rows at least. In this embodiment, the notches 116 are arranged in two rows and the through cavities 115 are arranged in three rows. There is at least one notch 116 in same row of the two rows of the notches 116, and all the notches 116 are arranged around the center axis of the stress releasing portion 11. There are the same number of through cavities 115 in a row and the notches 116 adjacent row of the cavities 115. The through cavities 115 are also arranged around the center axis of the stress releasing portion 11. In this embodiment, there are three the through cavities 115 in same row, and there are three notches 116 in same row. Ribs 117 are formed between the notches 116 in same row, and between the through cavities 115 in same row. Convexes 118 are formed between two adjacent rows of notches 116, between two adjacent rows of through cavities 115, between the notch 116 and the through cavities 115 and between two adjacent rows of the ribs 117. The height of the ribs 117 is equal to or lower than height of the convex 118 adjacent to the ribs 117. The distance of the same row of the notches 116 are gradually decreasing along the center axis direction of the stress releasing portion 11 from the rear surface 112 to the front surface 111. The distance of the same row of two through cavities 115 are gradually decreased along the center axis direction of the stress releasing portion 11 from the rear surface 112 to the front surface 111. That is the width of the ribs 117 being gradually decreased along the center axis direction of the stress releasing portion 11 from the rear surface 112 to the front surface 111. The length of the different rows of the notches 116 are gradually increased along the center axis direction of the stress releasing portion 11 from the rear surface 112 to the front surface 111. The length of the different rows of the through cavities 115 are gradually increased along the center axis direction of the stress releasing portion 11 from the rear surface 112 to the front surface 111. The length of the different rows of the ribs 117 are gradually increased along the center axis direction of the stress releasing portion 11 from the rear surface 112 to the front surface 111. That is the distance of two adjacent rows of the convexes 18 being gradually increasing along the center axis direction of the stress releasing portion 11 from the rear surface 112 to the front surface 111. The size of the different rows of the notches 116 are gradually increased along the center axis direction of the stress releasing portion 11 from the rear surface 112 to the front surface 111. The size of the different rows of the through cavities 115 are gradually increased along the center axis direction of the stress releasing portion 11 from the rear surface 112 to the front surface 111.

Projection on the XOY plan, Outer surfaces of the convexes 118 and the ribs 117 of the stress releasing portion 11 are of smooth arc shape, respectively. The radian of the smooth arc is gradually increased along the center axis direction of the stress releasing portion 11 from the rear surface 112 to the front surface 111. That is the arc being comprised of many different radius arcs are gradually increasing along the center axis direction of the stress releasing portion 11 from the rear surface 112 to the front surface 111. The distance between the convex 118 (or rib 117) near to the rear surface 112 and the center axis is longer than the distance between the convex 118 (rib 117) far from the rear surface 112 and the center axis.

Referring to FIG. 1, The strain relieving element 1 also comprises a connecting portion 12 extending rearwardly from the rear surface 112 and connecting to a connecting member (not shown). A cable 2 having a round columnar body and connecting to the connecting member is received in the receiving passage 114 and the connecting portion 12. An outer surface of the cable 2 is exposed out of the through cavities 115 on the front of the stress releasing portion 11.

In the present invention, the future of the invention are that the width of the ribs 17 are gradually decreased along the center axis of the stress releasing portion from the rear surface 112 to the front surface 111, and that the distance between two adjacent row of convexes 118 are increased along the center axis of the stress releasing portion from the rear surface 112 to the front surface 111. The strain relieving element 1 and the cable 4 have an improved function with anti-bending.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:
1. A strain relieving element, comprising:
a front surface;
a rear surface opposite to the front surface;
an intermediate portion connecting the front surface to the rear surface;
a receiving passage passing through the front surface and the rear surface;
two rows of through cavities extending inwardly from the intermediate portion at least;
a rib dividing the adjacent through cavities in same row; and
a convex respectively formed between the adjacent rows of the through cavities, and between the adjacent rows of the ribs,
wherein the rib near to the rear surface is bigger than the rib far from the rear surface, the width of the ribs are gradually decreased along an axis direction from the rear surface to the front surface.

2. The strain relieving element as recited in claim 1, wherein the area of the rear surface is bigger than the area of the front surface.

3. The strain relieving element as recited in claim 1, wherein the height of the rib is equal to or lower than the height of the convex.

4. The strain relieving element as recited in claim 1, wherein the through cavities are arranged in two rows at least, and there is at least one through cavity in the same row.

5. The strain relieving element as recited in claim 4, wherein the through cavities is communicated with the receiving passage.

6. The strain relieving element as recited in claim 5, wherein the strain relieving element further comprises a row of notch recessing inwardly from the intermediate portion and apart from the receiving passage.

7. The strain relieving element as recited in claim 6, wherein the notch is closer to the rear surface than the cavity, and the ribs are defined between the adjacent notches in same row.

8. The strain relieving element as recited in claim 1, wherein outer surfaces of the ribs and the convexes are of smooth arcs shape gradually increased along the axis direction from the rear surface to the front surface, respectively.

9. The strain relieving element as recited in claim 8, wherein the distance between the convex near the rear surface and the axis are longer than the distance between the convex far from the rear surface and the center axis.

10. The strain relieving element as recited in claim 8, wherein the distance between the rib near the rear surface and the center axis are longer than the distance between the rib far from the rear surface and the center axis.

11. A strain relieving element, comprising:
a front surface;
a rear surface opposite to the front surface;
an intermediate portion connecting the front surface to the rear surface;
a receiving passage passing through the front surface and the rear surface;
two rows of through cavities recessing inwardly from the intermediate portion at least;
a rib dividing the adjacent through cavities in same row; and
a convex respectively formed between the adjacent rows of the through cavities, and between a plurality of rows of the ribs,
wherein the rib near to the rear surface is bigger than the rib far from the rear surface, the distance between two adjacent rows of ribs are gradually increased along a direction from the rear surface to the front surface.

12. The strain relieving element as recited in claim 11, wherein the through cavities are communicated with the receiving passage.

13. The strain relieving element as recited in claim 12, wherein the strain relieving element further comprises at least a row of notch recessing inwardly from the intermediate portion, and the notch is apart from the receiving passage.

14. The strain relieving element as recited in claim 11, wherein outer surfaces of the ribs and the convexes are of smooth arc shape gradually increased along the axis direction from the rear surface to the front surface, respectively.

15. A cable comprising:
a columnar body; and a strain relief enclosing a front end of the columnar body, said strain relief defines a plurality of circumferential ribs axially spaced from one another via corresponding circumferential channels; wherein the circumferential channels which are closer to the front end of the columnar body, are axially smaller than those which are farther from the front end of the columnar body; wherein a plurality of dents are formed in each of the circumferential channels under condition that the dents which are located in the circumferential channel closer to the front end of the columnar body, are transversely smaller than those which are located in the channel farther from the front end of the columnar body.

16. The cable as claimed in claim 15, wherein the circumferential ribs which are closer to the front end of the columnar body, are diametrically larger than those which are farther from the front end of the columnar body.

17. The cable as claimed in claim 16, wherein the circumferential ribs have a same axial dimension with one another disregarding relative axial positions with regard to the front end of the columnar body.

18. The cable as claimed in claim 15, wherein the dents which are located in the circumferential channel farther from the front end of the columnar body, are radially deeper than those which are located in the channel closer to the front end of the columnar body.

19. The cable as claimed in claim 15, wherein each of said circumferential channels is complete without interruption circumferentially, and all said circumferential channels have a same depth radially.

\* \* \* \* \*